United States Patent [19]

Bestard

[11] 4,076,060
[45] Feb. 28, 1978

[54] ENERGY SAVING TREE HARVESTER

[75] Inventor: Thomas L. Bestard, Woodstock, Canada

[73] Assignee: Eaton Yale Ltd., Ontario, Canada

[21] Appl. No.: 780,575

[22] Filed: Mar. 23, 1977

[51] Int. Cl.² .......................... A01G 23/08; B27L 1/00
[52] U.S. Cl. .................................. 144/3 D; 144/2 Z; 144/34 R; 144/309 AC
[58] Field of Search .................... 144/3 D, 2 Z, 34 R, 144/309 AC

[56] References Cited

U.S. PATENT DOCUMENTS

| 3,554,245 | 1/1971 | Eynon | 144/3 D |
| 3,812,892 | 5/1974 | Jasinski et al. | 144/3 D |

Primary Examiner—Donald R. Schran
Attorney, Agent, or Firm—Gail S. Soderling

[57] ABSTRACT

An improved tree harvesting device of the swing boom type has an energy conserving drive mechanism for driving the swing boom. The energy conserving mechanism uses an energy storing means located between a prime mover and the swing boom; the energy storing means stores the energy dissipated by the swing boom when stopping.

9 Claims, 3 Drawing Figures

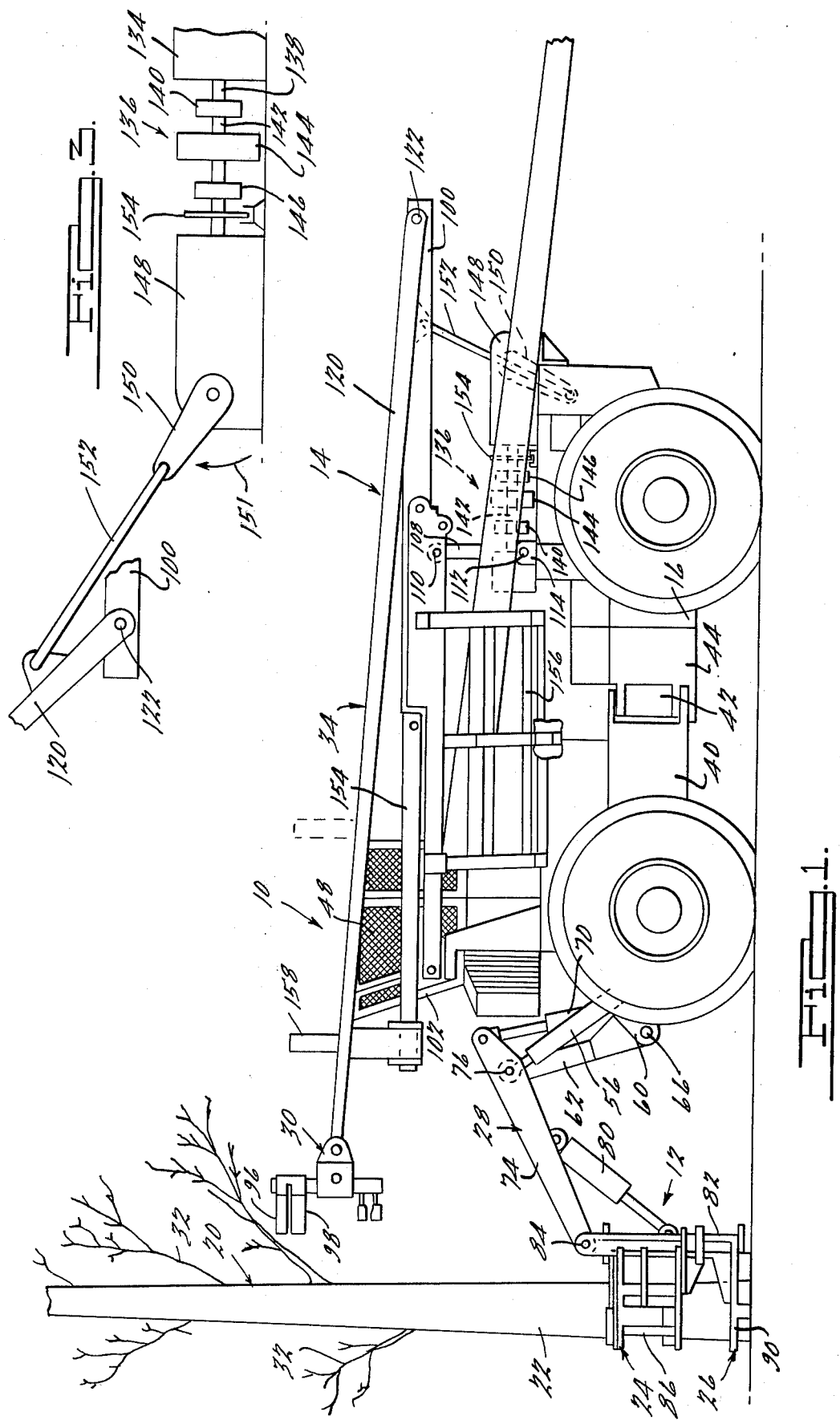

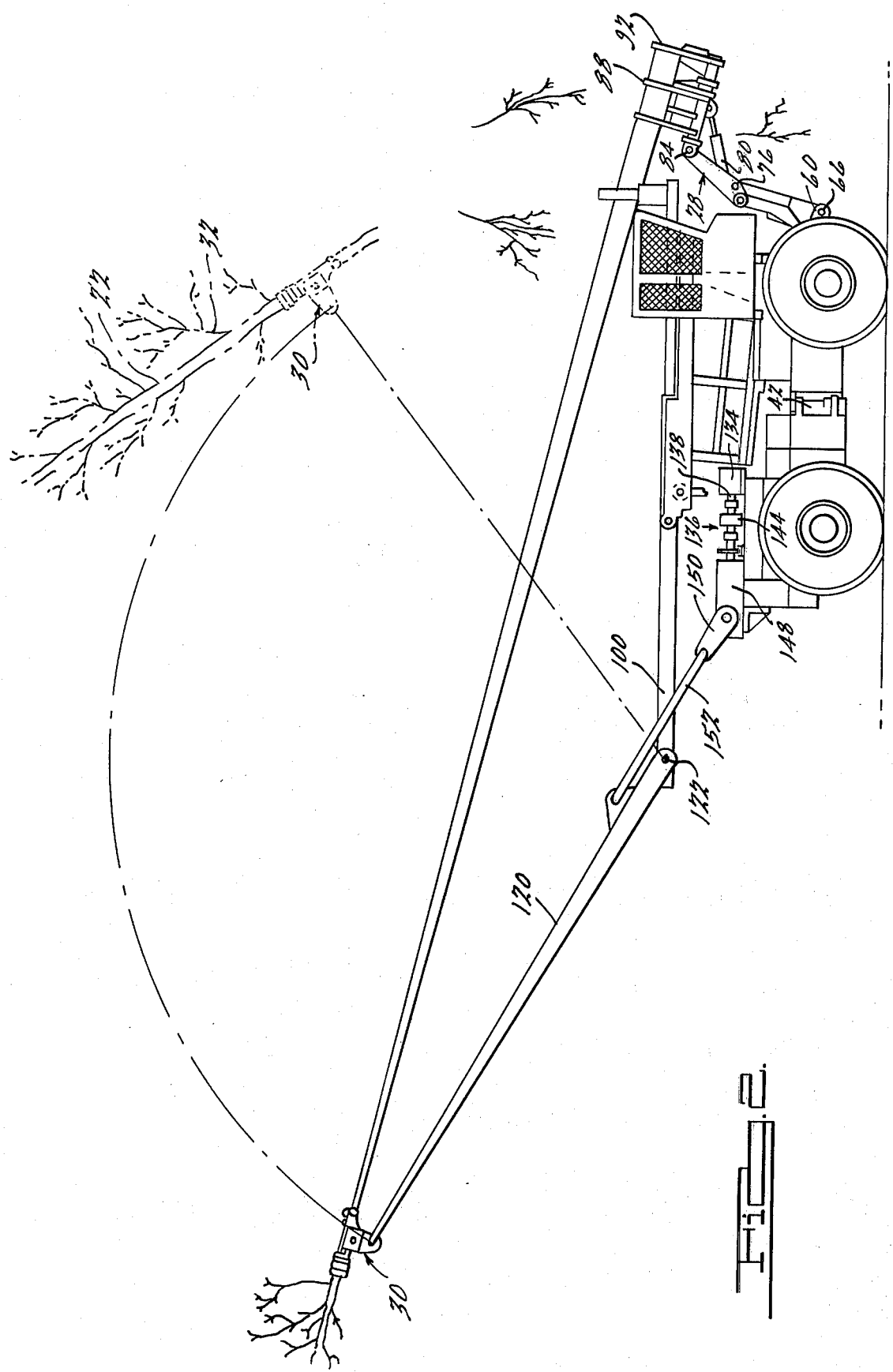

ENERGY SAVING TREE HARVESTER

BACKGROUND OF THE INVENTION

1. Field of the Invention

In one aspect, this invention relates to tree harvesting devices. In a further aspect, this invention relates to tree harvesters which have a swinging boom to delimb a harvested tree as it is lowered into a horizontal position.

2. Description of the Prior Art

Tree harvesting machines which fell and delimb a tree in one operation are known in the art. One example of such a machine is described in U.S. Pat. No. 3,812,892. The harvester described uses a hydraulic actuating cylinder to drive a delimbing boom during the delimbing cycle.

While the prior art machines provide good harvesting capabilities, they expend large amounts of energy due to rapid acceleration and deceleration of the delimbing boom during delimbing. Also, the rapid acceleration and deceleration place large stresses on the boom during the delimbing stroke.

SUMMARY OF THE INVENTION

It is an object of this invention to provide a delimbing assembly for a tree harvester which does not require large amounts of energy to start and stop.

It is a further object of this invention to provide a drive mechanism which precisely controls the motion and acceleration of the delimbing boom to reduce stresses in the boom.

The objects of this invention can be achieved by using a drive means comprising a drive motor, an energy storage mechanism and a driving means adapted to move the delimbing head. The energy storage mechanism stores energy released during deceleration of the delimbing boom at the end of the delimbing stroke. This conserves energy normally wasted by decelerating the boom. Channeling the deceleration energy into the energy storage mechanism not only saves energy, it moderates the deceleration of the boom to reduce stress. As the boom is activated at the beginning of a delimbing stroke, the energy storage mechanism will furnish energy to accelerate the delimbing head smoothly up to speed.

As a further feature of this invention, a torque limiting clutch is disposed within the driving mechanism. The torque limiting clutch limits the amount of force which can be applied to and from the delimbing head which prevents damage to the drive mechanism if the delimbing head jams.

BRIEF DESCRIPTION OF THE DRAWINGS

In the accompanying drawings:

FIG. 1 is an elevational view showing a tree harvester of this invention in the felling position;

FIG. 2 is a schematic illustration of the delimbing of the tree trunk as it is being felled; and FIG. 3 is an enlarged view of the energy conserving mechanism.

DETAILED DESCRIPTION OF THE PREFERRED EMBODIMENT

A tree processing apparatus 10 constructed in accordance with the present invention includes a felling assembly 12 and a delimbing assembly 14 mounted on an articulated vehicle 16. When a standing tree 20 is to be delimbed, the tree trunk 22 is engaged by a gripper assembly 24 and severed adjacent the ground by a shearing assembly 26. A felling boom 28 is then actuated to move the tree trunk 22 into engagement with a delimber assembly 30. The felling boom 28 is then operated to move the tree trunk 22 from a standing position as shown in FIG. 1 to a generally horizontal or fallen position. As the tree is being felled, the delimber assembly 30 is moved along the tree trunk 22 to sever or cut limbs 32 from the tree trunk 22 in the manner illustrated schematically in FIG. 2. The delimber head or assembly 30 is moved along the tree trunk 22 under the influence of a swing boom 34.

The articulated vehicle 16 has a front section 40 which is connected in a known manner at a hinge joint 42 with a rear section 44. An operator's cab 48 is mounted on the front section 40 of the vehicle 16 in an off-center position. As shown, the cab 48 is disposed over a right front wheel of the vehicle 16 allowing the delimbing assembly 30 to be centrally mounted on the body sections 40 and 44. This cab position provides the operator with an unobstructed view of the felling assembly 12 to facilitate moving the felling assembly into engagement with the tree trunk 22.

After locating the harvester 16 adjacent a tree 20, the felling boom 28 can be rotated to either side about a vertical axis disposed midway between the front wheels of the vehicle by a suitable motor (not shown). This movement will position the gripper assembly 24 in general alignment with the tree trunk 22. Once the gripper assembly 24 has been aligned with the tree trunk, a hydraulic motor 56 attached to bracket 66 on the vehicle 16 extends a base boom section 62. As the base boom section 62 swings outward, a second hydraulic motor 70 between bracket 60 and intermediate boom section 74 begins operating. Operation of the motor 70 pivots the intermediate boom section 74 about a connection 76. As motors 56 and 70 are operating, a third hydraulic motor 80 is actuated to swing an outer boom section 82 about a pivot connection 84 into vertical alignment with the tree trunk 22.

As the felling boom is extended by operation of the three boom motors 56, 70 and 80, gripper arms 86 and 88 are moved into position on opposite sides of the tree trunk 22. The gripper arms 86 and 88 are clamped about the trunk 22 by a suitable actuator motor (not shown). Since the gripper's general construction and mode of operation are known, further description is omitted to avoid prolixity.

Once the gripper assembly is securely clamped, the shear assembly 26 severs the tree trunk 22 near the ground. The shear assembly 26 includes two movable blades 90 which are pivoted towards each other by a suitable means (not shown). The blades cooperate to sever the tree trunk in a known manner.

After the trunk 22 is severed, it is held in an upright position by the gripping assembly 24 and moved into engagement with the delimber assembly 30 such as by retracting the felling boom. This is accomplished by the hydraulic motor 56. The delimber assembly 30 is initially disposed in front of the vehicle to facilitate engaging the tree trunk. If necessary, a suitable motor (not shown) can be actuated to pivot the base boom section 62 about a vertical axis disposed midway between the front wheels to align the tree trunk 22 and the delimber 30. It should be noted that the tree trunk 22 is maintained in a generally upright or standing position as it is moved into engagement with the delimbing assembly.

Once the delimber 30 is brought into engagement with the tree trunk, the delimber assembly is moved along the tree trunk 22 stripping the limbs 32 from the trunk. As the tree trunk 22 is being delimbed, the gripping assembly 24 moves the trunk 22 from a standing or upright position as shown in FIG. 1 toward a horizontal or fallen position as shown in FIG. 2. Delimbing the tree trunk as it is being laid into a horizontal position decreases the amount of time necessary to fell and delimb the tree. Also, delimbing the tree trunk as it is laid into a horizontal position saves energy. The delimber 30 prevents the tree from falling at the acceleration rate of gravity so the tree's weight for the last half of the stroke attempts to accelerate the delimber. This force from the tree trunk is recouped reducing the amount of work required from the delimbing drive motor 134. However, delimbing during felling is not a necessary part of this invention.

The delimbing assembly includes a pair of delimbing blades 96 and 98 which circle the tree trunk 22. The delimbing blades 96 and 98 have relatively sharp upper edge portions (as viewed in FIG. 1) which readily sever the branches 32 attached to the tree trunk 22 as the delimbing assembly 30 moves along the tree trunk from its base towards the top. The blades are pressed against the tree trunk 22 as the delimber assembly moves along the tree trunk. When the diameter of the trunk 22 has decreased to a predetermined minium, the delimber assembly 30 tops or cuts off the remaining tree trunk and moves beyond the end of the tree trunk.

The delimber assembly is moved along the trunk of the tree by the influence of the swing boom 34. The boom 34 includes a base section 100 which is pivotably connected at 102 with an upstanding support frame member 104 disposed approximately midway between the front wheels of the vehicle 16. A rear end portion of the base section 100 is connected to the rear body section 44 of the vehicle at a link 108. To enable the front 40 and rear 44 sections of the vehicle to move relative to each other, the second link 108 is pivotably connected with the boom section at 110 and also pivotably connected at 112 to the mounting flange 114.

In detail, as the tree trunk 22 is felled from the standing position, the delimber assembly 30 moves outwardly along the tree trunk by pivoting an outer section 120 of the swing boom 34 about the connection 122 which joins outer section 120 to the base section 100. The pivoting movement of the outer portion 120 of the swing boom as it moves along the tree trunk causes the delimber assembly 30 to move rearwardly along an arcuate path from the initial position shown in FIG. 1. As the delimber assembly is moving along its arcuate path, the tree trunk base is swung downwardly and rearwardly by the felling boom 28. The trunk's path as it is swung downward and rearward extends over the vehicle with the gripper assembly 24 maintaining a secure grip on the front end of the tree trunk. The butt is moved upwardly and rearwardly by the outer boom section 82 of the felling assembly.

The outer boom section 120 of the delimbing assembly is pivoted about the connection 122 under the influence of a fluid motor 134. The fluid motor 134 is connected with the outer boom section 120 by means of an energy conserving drive train of this invention, designated generally 136. Generally the fluid motor 134 furnishes power to a shaft 138 which in turn drives an overrunning clutch 140. During delimbing, the overrunning clutch 140 provides power to a second shaft 142 on which is mounted a flywheel 144. The flywheel 144 furnishes power to a torque limiting clutch 146 which drives a gear train 148 and a rotating crank 150. The rotating crank 150 in turn pushes a linking arm 152 to an extended position forcing the swing boom 120 along its arcuate path. The fluid motor 134, overrunning clutch 140, and brake 154 are all well-known commercially available components and will not be described in detail.

In operation, the delimber assembly 30 undergoes several changes in speed. The delimbing boom 120 must be accelerated at the start of the delimbing stroke, decelerated at the end of the delimbing stroke, accelerated again to return the boom to its starting position and decelerated to the rest position. The driving mechanism 136 used in the practice of this invention is adapted to store energy during the deceleration portions of the stroke and thereby capture energy which normally would be lost in braking forces.

In operation, before the delimber is used, the flywheel is started by engaging the hydraulic motor 134 until the flywheel has reached operating speed.

When the delimbing drive is engaged, the brake 154 is released allowing the crank 150, boom 120 and gear box 148 free rotation. As shown by the arrow 151 in FIG. 3, the crank 150 rotates clockwise. The torque limiting clutch 146 is engaged connecting the rotating flywheel 144 to the gear box 148. Because of the energy stored in the flywheel, the gear box and boom are quickly accelerated to speed and simultaneously decreasing the flywheel's speed. As the flywheel 144 decreases in speed below the hydraulic motor's speed, the overrunning clutch 140 connects the hydraulic motor to the flywheel. The delimbing power for the remainder of the cycle is provided by the hydraulic motor 134 through the overrunning clutch 140, flywheel 144, torque limiting clutch 146, and associated drive mechanisms.

As the boom 120, traveling at speed, reaches the end of the delimbing stroke, a braking action is required to stop the delimbing head. The crank 150, due to its rotary motion, provides a good braking force. However, the momentum of the boom 120 and delimbing head 30 resist deceleration and will try to force the crank 150 to rotate the crank faster as it reaches the "top dead center" position. Increasing the speed of the crank increases the flywheel's speed. The overrunning clutch 140 allows the flywheel 144 to absorb energy and run faster than the the hydraulic motor 134. Thus, the kinetic energy from the boom is stored in the flywheel. At this point, the hydraulic motor is not running under load and therefore draws negligible power.

As the crank 150 rotates past "top dead center," the resistance to crank rotation caused by boom inertia tends to slow the crank down which in turn slows the flywheel.

When placing the boom in a parked position, as the crank reaches bottom dead center, the torque limiting clutch 146 is disengaged. Since the flywheel has been accelerated by decelerating the boom, the hydraulic motor 134 is again not running under load and draws negligible power. The brake 154 stops the gear box 148 and crank 150, which have only minimal kinetic energy. The boom 120 is already stopped. The flywheel 144 will be spinning at a high rate of speed storing energy for the next delimbing cycle.

The torque limiting clutch 146 is set to slip if the delimbing boom 120 jams. This prevents the boom 120 from being injured or destroyed.

After the tree trunk 22 has been delimbed and topped by the delimber assembly 30, the delimber assembly is disengaged from the tree trunk. The trunk is then transferred to a bunk assembly 156 by a transfer clamp 158. One suitable transfer clamp is described in detail in U.S. Pat. No. 3,812,892, the disclosure of said clamp being incorporated herein by reference.

Once the delimbed and topped tree trunk 22 has been deposited in the bunk assembly 156, the delimbing boom assembly 30 is moved back to the retracted position shown in FIG. 1. The clamp 158 is repositioned in a starting position and the felling boom assembly 24 is retracted towards the vehicle to its driving position. The vehicle 16 can then be readily and easily driven to another location adjacent the next tree to be felled. When the bunk assembly 156 is filled with delimbed and topped tree trunks, the vehicle 16 can be utilized to carry the tree trunks to an unloading location.

In view of the foregoing description, it can be readily seen that the tree harvesting apparatus includes a felling assembly with a gripping assembly for gripping the tree trunk of a standing tree to be severed by a shear. The severed tree trunk is then moved by the felling assembly into engagement with a delimber assembly and the delimber assembly delimbs the trunk of the tree as the tree moves from the upright or standing position towards a horizontal position. The delimber assembly is mounted on a movable boom section and driven by driving means which includes a gear box, a flywheel, an overrunning clutch and a hydraulic motor or other power source. Especially, it should be noted that diesel, gas or electric motors could provide the power to drive the overrunning clutch shaft 138, independently of the vehicle's remaining systems. By delimbing the trunk of the tree using the flywheel for starting and stopping the delimbing assembly, the total time for harvesting the tree is minimized, and the total amount of energy expended on using the boom is considerably less than similar devices which utilize the hydraulic motor as a sole means for driving the delimbing head.

Various modifications of the driving means will become apparent to those skilled in the art on reading the foregoing description, and it is understood that this invention is not limited to the illustrative embodiment described hereinbefore.

I claim:

1. An apparatus for felling and delimbing a tree comprising:
   means for severing the trunk of a standing tree;
   means for felling a tree from a standing position to a fallen position;
   delimbing means cooperating with the felling means and operable to delimb the tree in a substantially continuous operational step as the tree trunk is moved from the standing position to the fallen position, said delimbing means icluding a delimber head which removes branches from the trunk of the tree as the delimber head is moved along the trunk of the tree, and a delimbing boom for moving the delimber head along the tree trunk; and
   drive means for moving said delimbing boom from a first position wherein said delimber head is adjacent the butt end of the tree to a second position wherein said delimbing head is adjacent the top of the tree, and stopping said boom in said second position, said drive means including energy storing means operable to store energy dissipated in bringing said boom to a stop in said second position and to transfer said energy to the boom to accelerate the boom when said boom is moved from said first position toward said second position.

2. Apparatus as claimed in claim 1, in which said driving means includes a flywheel as an energy storing device.

3. Apparatus as claimed in claim 2, in which said driving means includes a motor, a flywheel connected to the motor in a manner to allow differential rotational speed between the motor and the flywheel, a gear box connected to the output of said flywheel, and a torque limiting clutch interposed between said gear box and said flywheel.

4. Apparatus as claimed in claim 1, in which said driving means comprises a rotary motor, an overrunning clutch connected to the output of the motor, a flywheel connected to the output of said overrunning clutch, and a gear box connected to the output side of said flywheel, said gear box including an output crank arm operatively connected to said delimbing boom.

5. Apparatus as claimed in claim 4, in which said crank arm and delimbing boom are so arranged that one complete revolution of said crank arm moves said delimbing boom from said first position to said second position, and back to said first position.

6. Apparatus as claimed in claim 4, in which said driving means includes a torque limiting clutch located between said flywheel and said gear box.

7. Apparatus as claimed in claim 4, in which said drive means includes a brake located between said flywheel and said gear box.

8. Apparatus as claimed in claim 1, in which said driving means comprises a rotary motor, a flywheel adapted to be driven by the motor, a clutch which allows the flywheel to rotate faster than said motor, and a gear box connected to the output side of said flywheel, said gear box including an output crank arm operatively connected to said delimbing boom.

9. Apparatus as claimed in claim 8, in which said driving means comprises a hydraulically driven motor.

* * * * *